No. 773,504. PATENTED OCT. 25, 1904.
J. H. JONES.
RUNNING GEAR FOR VEHICLES.
APPLICATION FILED JULY 10, 1903.
NO MODEL.

Witnesses
Geo. V. Rasmussen

Inventor
James H. Jones.
By his Attorney
R. C. Mitchell

No. 773,504. Patented October 25, 1904.

UNITED STATES PATENT OFFICE.

JAMES H. JONES, OF BRISTOL, CONNECTICUT, ASSIGNOR TO THE CORBIN MOTOR VEHICLE CORPORATION, OF NEW BRITAIN, CONNECTICUT, A CORPORATION OF CONNECTICUT.

RUNNING-GEAR FOR VEHICLES.

SPECIFICATION forming part of Letters Patent No. 773,504, dated October 25, 1904.

Application filed July 10, 1903. Serial No. 164,950. (No model.)

*To all whom it may concern:*

Be it known that I, JAMES H. JONES, a citizen of the United States, residing at Bristol, in the county of Hartford, State of Connecticut, have invented certain new and useful Improvements in Running-Gear, of which the following is a full, clear, and exact description.

My invention relates to improvements in running-gears for motor-vehicles.

Among the objects of the invention are to provide a simple and efficient running-gear for motor-vehicles, particularly of the lighter class, and to provide means of adjustment whereby the tension of the power-transmitting chain may be readily varied as the occasion demands.

Figure 1:
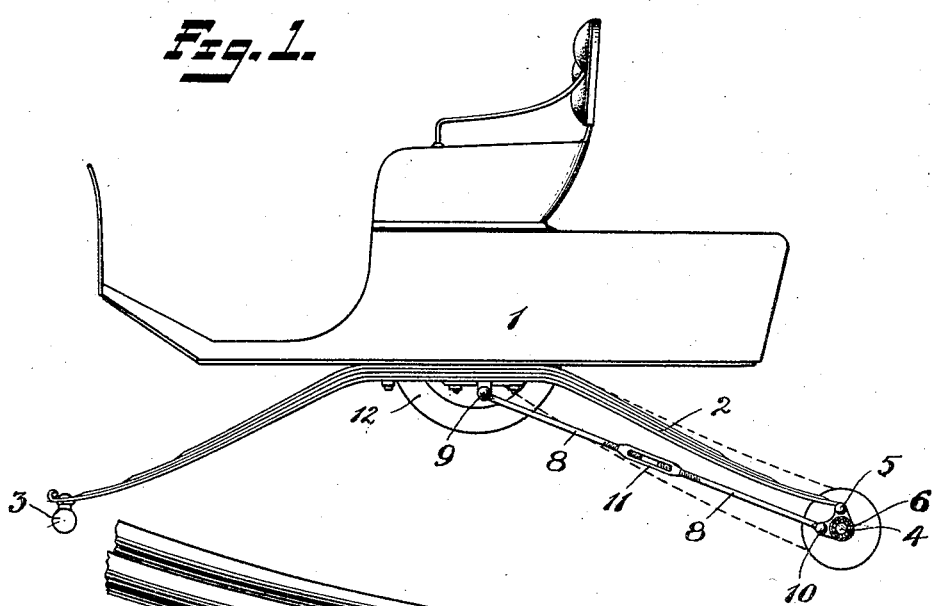
Figure 2:
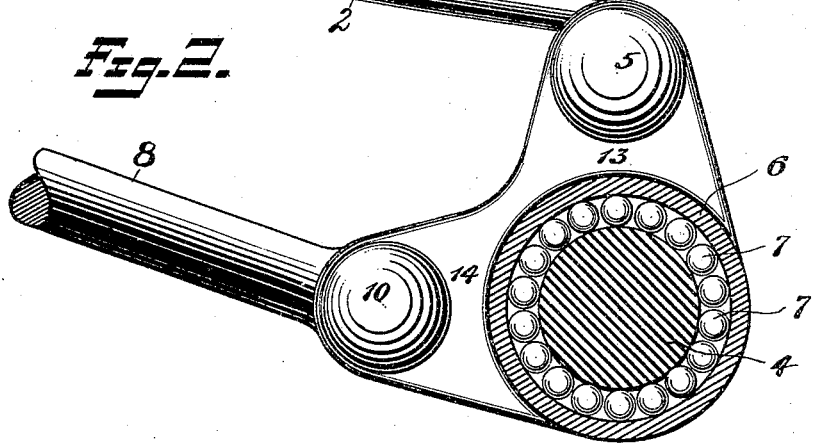
Figure 3:
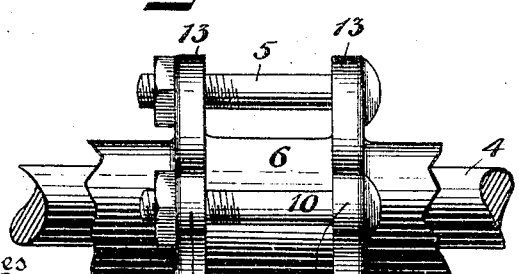

Figure 1 is a side elevation of the body of a motor-vehicle, the wheels and other unnecessary parts being removed. In this view certain details are shown in section. Fig. 2 is a relatively enlarged detail view, partly in side elevation and partly in section. Fig. 3 is a front elevation of one of the details shown in Fig. 2, this view being slightly reduced.

1 is the vehicle-body.

2 is a spring. The particular form of springs employed are termed "side-bar" springs, in that they are secured to the side of the frame or body and extend fore and aft. The springs 2 are connected with the forward and rear axles. The method of connection to the forward axle is immaterial to this invention. The method of connection to the rear axle involves the invention herein explained.

3 is the forward axle.

4 is the rear axle.

Referring more particularly to Fig. 2, it will be seen that the end of the spring 2 is pivotally connected at 5 to a bearing-block 6, in which the axle 4 revolves. If desired, antifriction devices, such as balls 7 7, may be introduced between the said blocks 6 and the axle 4.

8 is a radius-rod, the same being hinged or otherwise suitably connected at 9 to the main frame or body 1. It is preferable to have the forward end of the radius-rod located substantially at the motor center, although it is not necessary that it should be exactly at that point. The other end of the radius-rod is hinged or otherwise suitably connected at 10 to the block 6.

11 is a turnbuckle constituting a part of the radius-rod and by which the same may be lengthened or shortened, as desired, to tighten or loosen the transmission-chain.

The transmission-chain is conventionally represented by a dotted line leading from the usual sprocket on the rear axle to a motor-driven sprocket. (Not shown.)

In Fig. 3 the bearing-block 6 is shown to have lugs 13 13, which support the pivot 5, upon which the spring 2 is mounted. The block 6 is also provided with lugs 14 14, which support the pivot 10, to which the radius-rod 8 may be attached. It will be observed that the lugs 13 are located on the upper portion of the block 6. Hence the springs 2 stand above the axle 4. The radius-rods 8 provide an adjustment for the transmission-chain and serve to hold the block 6, so that the end of the springs 2 will remain in position above the axle 4 and aid in taking the drag of the chain while the vehicle is being propelled either backward or forward. From the foregoing it will be seen that by lengthening or shortening the radius-rod 8 the axle proper is moved backward or forward on the hinged connection at 5. In traveling over uneven surfaces springs yield in the usual manner, but both of said hinged connections 5 and 10 preserve approximately their set positions, so that the tension of the chain will remain uniform irrespective of the bend of the spring.

It will be observed that the lugs 13 14 are located on the bearing-block at substantially right angles relatively to the axis of rotation of the shaft 4. Obviously they could be located diametrically thereto or the arrangement otherwise modified, as desired, so long as they are spaced far enough apart, so that the bearing-block cannot twist around the end of the spring and ride above the same. Obviously the normal position of the bearing-block could, if it were desirable, be above the spring, in which event the radius-rod would also be connected to the bearing-block above the spring to prevent any oscillating motion of the bearing-block, since that would permit of variation in the tension of the chain, the result of which would be that the chain would be likely to ride off the sprockets.

The construction of the main frame or body is of course immaterial to the invention. It is also entirely immaterial what form of motor is used.

What I claim is—

1. In a motor-vehicle, the combination of a body, a motor-driven shaft carried thereby, a main axle, a power-transmitting chain connecting said shaft with said axle, a bearing-block pivotally mounted on said axle, a fore-and-aft spring having one end secured to said body and the other end secured to said block and a radius-rod having one end secured to said body and the other end secured to said block, and means for adjusting the length of said rod to vary the distance between the axis of the motor-driven shaft and said axle, substantially as described.

2. In a motor-vehicle, the combination of a body, a motor-driven shaft carried thereby, a main axle, a power-transmitting chain connecting said shaft with said axle, a bearing-block having ball-bearings pivotally mounted on said axle, a fore-and-aft spring having one end secured to said body and the other end secured to said block and a radius-rod having one end secured to said body and the other end secured to said block, and means for adjusting the length of said rod to vary the distance between the axis of the motor-driven shaft and said axle, substantially as described.

JAMES H. JONES.

Witnesses:
R. C. MITCHELL,
PAUL P. WILCOX.